UNITED STATES PATENT OFFICE

ERNST KORTEN, OF FECHENHEIM, NEAR FRANKFORT-ON-THE-MAIN, GERMANY, ASSIGNOR TO GENERAL ANILINE WORKS, INC., OF NEW YORK, N. Y., A CORPORATION OF DELAWARE

HYDROGENATED HYDROXY-DERIVATIVES OF THE DIPHENYL SERIES AND PROCESS FOR MAKING

No Drawing. Application filed April 9, 1928, Serial No. 268,810, and in Germany April 12, 1927.

The present invention relates to a process for manufacturing hydrogenated hydroxy-derivatives of the diphenyl series and to the new products obtainable thereby.

I have found that the condensation products obtainable by condensing a hydroxy-benzene compound with a hydro-aromatic ring ketone compound of the cyclohexanone series by means of a hydrohalic acid, and corresponding to the general formula

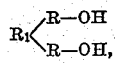

wherein the R's means benzine nuclei and $R_1$ means a hydrogenated benzene nucleus, which nuclei all may contain further substituents, are decomposed by heating them to an elevated temperature. This reaction may be accelerated by the addition of a catalyst such as, for instance, acids, acidic or easily dissociating salts. As the products obtained by this process have a lower boiling point than the starting materials, the decomposition reaction may be carried out in form of a distillation process.

By my process one molecule of phenol is split off from the molecule of the tri-nuclear starting material and thereby di-nuclear products are formed, which are hydrogenated hydroxyderivatives of the diphenyl series. They correspond probably to the general formula $C_6H_x$—$C_6H_4$—OH, wherein $x$ means the number 9 or 11 and one or more hydrogen atoms in both nuclei may be replaced by monovalent substituents. Generally mixtures of these two species of reaction products are formed. Among the hexahydrogenated compounds, obtainable according to my process, the hexahydro-4'-hydroxyldiphenyl is already known, it is described by Wuyts (Bulletin de la Société Chimique de Belgique, Vol. 26, page 304) as identical in its properties with the product obtained by my process.

The tetrahydrogenated hydroxy-diphenyl-compounds are unknown hitherto, they show similar properties as the hexa-hydro-compounds. Thus they form well defined crystalline and rather difficultly soluble alkali salts. But due to an aliphatic double bond they possess an unsaturated character, so that they easily take up bromine, hydrogen etc. The proportion of these two species of compounds within the reaction mixtures depends generally upon the reaction conditions. For instance, when working under milder conditions, for example, without any catalyst or by rapidly carrying out the distillation process, the quantity of tetrahydro-compounds in the reaction products is increased.

All these products are important intermediates for the manufacture of dyestuffs and pharmaceutical products.

In order to further illustrate my invention the following examples are given; I wish it however understood, that I am not limited to the particular examples given nor to the specific conditions mentioned. The parts are by weight and all temperatures in centigrade degrees.

Example 1

The 4.4'-dihydroxy-diphenyl-cyclohexane, obtainable by condensing cyclohexanone with phenol in an acetic acid solution by means of hydrochloric acid, is distilled in vacuo. When the phenol formed by the decomposition is removed from the distillate, the distillation product is purified either by a steam distillation or by recrystallization from hot water or boiling benzene, from which it crystallizes as fine woolly colorless needles melting at about 124°. The new product is suggested to be a tetrahydro-4-hydroxy-diphenyl of the formula

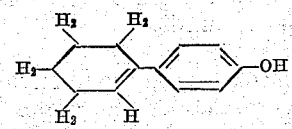

It is easily soluble in a dilute caustic soda solution and crystallizes from a more concentrated caustic soda solution as the sodium salt, which forms bright needles.

Example 2

75 parts of 4.4'-dihydroxy-diphenyl-cyclohexane and 20 parts of anhydrous zinc chloride are melted in a vessel provided with a stirrer. At about 200° the mass comes to a violent boiling while darkening and an oil distills off containing phenol and boiling under ordinary pressure at about 180°. In order to remove the zinc chloride, the residue of the distillation is extracted with dilute hydrochloric acid. Then it is dissolved in a hot caustic soda solution. From this solution by adding common salt or an excess of a caustic soda solution a difficultly soluble sodium salt is precipitated as large crystals having a mother-of-pearl luster. By acidifying the solution of the sodium salt and recrystallizing the product thus precipitated from benzene, benzine or dilute spirit, it is obtained as snow white needles of a melting point of 128–129°. This product is probably identical with the hexa-hydro-4-hydroxyl-diphenyl of the formula:

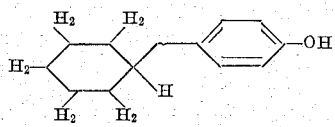

Example 3

At about 200° a stream of dry hydrogen-chloride gas is allowed to pass through 150 parts of molten 4.4′-dihydroxy-diphenyl-cyclohexane, until no more phenol distills off. Then the residue is distilled in vacuo and a fraction is collected boiling between 180–210° which solidifies on cooling. By crystallization from benzene or benzine snow white star-shaped needles are obtained melting at 128–129°, being probably identical with the product described in Example 2.

Example 4

4.4′-dihydroxy-3.3′-dimethyl-diphenyl-methylcyclohexane, prepared from ortho cresol and technical methylcyclohexanone, is distilled in vacuo. After the cresol formed by the decomposition process is distilled off, an oil passes over which solidifies in the cold. It is soluble in a caustic soda solution and in organic solvents and shows an unsaturated character, for instance, by the ability of taking up bromine. As the technical methylcyclohexanone employed contains several isomers, the product of reaction is a mixture of isomeric hydrogenated hydroxy-dimethyl diphenyl-compounds.

I claim:

1. A process which comprises subjecting condensation products corresponding to the general formula

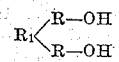

wherein the R's mean benzene nuclei and $R_1$ means a hydrogenated benzene nucleus, which nuclei all may contain further substituents, to a distillation in vacuo at temperatures of about 200° C.

2. As new products tetrahydrogenated hydroxy-derivatives of the diphenyl series corresponding probably to the general formula $C_6H_9$—$C_6H_4$—$OH$, wherein one or more hydrogen atoms in both nuclei may be replaced by monovalent substituents, which products are crystalline substances, having a definite melting point, soluble in a caustic soda solution and in organic solvents, and showing an unsaturated character.

3. As a new product the terahydro-4-hydroxy-diphenyl corresponding probably to the formula

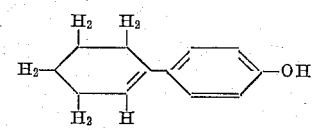

which product is a crystalline substance, melting at about 124°, soluble in a caustic soda solution and in organic solvents and showing an unsaturated character.

4. The process for manufacturing hydrogenated hydroxy derivatives of the diphenyl series which comprises heating a condensation product of the general formula

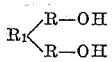

wherein R stands for a benzene nucleus, and $R_1$ stands for a hydrogenated benzene nucleus, which nuclei may contain further substitutents to a temperature of about 200° C.

5. The process for manufacturing hydrogented hydroxy derivatives of the diphenyl series which comprises heating a condensation product of the general formula

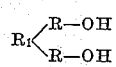

wherein R stands for a benzene nucleus, and $R_1$ stands for a hydrogenated benzene nuclues, which nuclei may contain further substituents to a temperature of about 200° C., in the presence of a catalyst.

6. The process for manufacturing hydrogenated hydroxy derivatives of the diphenyl series which comprises heating a condensation product of the general formula

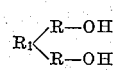

wherein R stands for a benzene nucleus, and $R_1$ stands for a hydrogenated benzene nucleus, which nuclei may contain further substituents to a temperature of about 200° C., removing the phenol compound formed thereby, and isolating the decomposition product from the reaction mass by a distillation in vacuo.

7. The process for manufacturing hydrogenated hydroxy derivatives of the diphenyl series which comprises heating a condensation product of the general formula

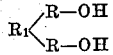

wherein R stands for a benzene nucleus, and $R_1$ stands for a hydrogenated benzene nucleus, which nuclei may contain further substituents to a temperature of about 200° C., in the presence of a catalyst, removing the phenol compound formed thereby, and isolating the decomposition product from the reaction mass by a distillation in vacuo.

8. The process which comprises distilling in vacuo a condensation product of the general formula

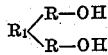

wherein R stands for a benzene nucleus, and $R_1$ stands for a hydrogenated benzene nucleus, which nuclei may contain further substituents to a temperature of about 200° C., and subjecting the distillate to a fractional distillation.

In testimony whereof I have hereunto set my hand.

ERNST KORTEN.